Patented Oct. 9, 1945

2,386,454

UNITED STATES PATENT OFFICE 2,386,454

HIGH MOLECULAR WEIGHT LINEAR POLYESTER-AMIDES

Carl J. Frosch, Summit, N. J., assignor to Bell Telephone Laboratories, Incorporated, New York, N. Y., a corporation of New York No Drawing. Application November 22, 1940, Serial No. 366,718

6 Claims. (Cl. 260—78)

This invention relates to new compositions of matter and more particularly to high molecular weight linear polymers having amide and ester linkages, being of micro-crystalline structure in the solid state, and possessing valuable properties.

It has heretofore been proposed in Carothers Patent No. 2,071,250 and in its related Patents Nos. 2,071,251, 2,071,252, 2,071,253, 2,130,523 and 2,130,948 to produce high molecular weight linear polymers suitable for formation into fibres filaments, threads, fabrics and for other uses. These patents disclose various polymers and processes for producing them as by condensation of hydroxy acids to form polyesters, the condensation of amino acids to form polyamides, the condensation of glycols to form polyethers, the condensation of dibasic acids to form polyanhydrides, etc. The processes described in these patents are, however, in most cases characterized by the necessity for employing as starting materials relatively expensive substances. This is to a large extent caused by the fact that, as described in said patents, it is necessary to employ as at least one of the starting materials a substance which has a relatively long chain of atoms, usually five or more, between the functional end groups, this in order to prevent the formation of cyclic compounds which would prevent polymerization into high molecular weight linear substances.

It is one object of the present invention to produce from starting materials, never before employed for such purposes, wholly new high molecular weight linear polymers, having amide and ester linkages and possessing the property of structural orientation under stress, which may be advantageously employed in the manufacture of strong, pliable, elastic fibres, filaments, threads and fabrics prepared therefrom; in the formation of sheets; in the coating of objects; in electrical insulation, either in the form of a coating, impregnant, or in the form of threads and fabrics; and which may be employed for other purposes.

It is another object of the present invention to produce such polymers from starting substances which may be commercially available at lower costs than most, if not all, of the starting substances heretofore employed in the manufacture of high molecular weight linear condensation polymers.

These and other objects of the present invention which will be apparent from the following discussion, are accomplished by condensing under suitable conditions a mono-alcoholamine, having the general formula NH₂—R—OH, with a dibasic or dicarboxylic acid having the general formula HOOC—R'—COOH, where R and R' are suitable divalent organic radicals, R containing no groups which react with a carboxyl group and R' containing no groups which react with a hydroxyl or NH group. Moreover, R should include between the NH₂ and OH groups of the alcoholamine a chain of at least two atoms, while R' should include between the two carboxyl groups of the acid a chain of at least three atoms, this in order to prevent interference with the polymerization of the substances into the desired long high molecular weight chains.

Preferably it is desirable to employ in the reaction a mono-alkylolamine in which R is (CH₂)ₓ, i. e., having the formula NH₂—(CH₂)ₓ—OH where x is a whole number having a value of at least two, and a dibasic acid in which R' is (CH₂)ᵧ, i. e., having the general formula

HOOC—(CH₂)ᵧ—COOH where y is a whole number having a value of at least three. When such substances are employed the linear polyester-amides of high molecular weight which are formed solidify more readily and possess characteristics which in general are more desirable than when other types of alcoholamines and dibasic acids are employed as starting substances.

Heating of the mono-alcoholamine and the dibasic acid together under conditions such that the water which is formed by the condensation reaction is removed or rendered innocuous and such that access of oxygen to the reacting substances or the reaction product is prevented results in reaction of the monoalcoholamine and dibasic acid according to one or both of the reactions indicated by the following formulas:

HO—R—NH₂+HOOC—R'—COOH=
    HO—R—NH—CO—R'—COOH+H₂O  (1a)

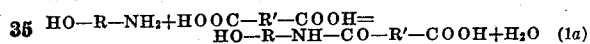
n[HO—R—NH—CO—R'—COOH]=
    H[O—R—NH—CO—R'—CO]ₙOH+[n—1]H₂O   (1b)

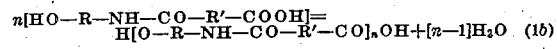
2[HO—R—NH₂]+HOOC—R'—COOH=
    HO—R—NH—CO—R'—CO—NH—R—OH+2H₂O  (2a)

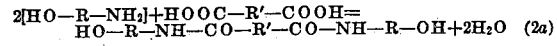
n[HO—R—NH—CO—R'—CO—NH—R—OH]+   (2b)
    n[HOOC—R'—COOH]=
H[O—R—NH—CO—R'—CO—NH—R—O—CO—R'—CO]ₙOH+
                                      [2n—1]H₂O

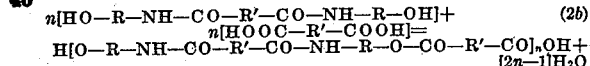

In general, equal or approximately equal molar weight proportions of the desired mono-alcoholamine and dibasic acid are placed in a suitable closed vessel and heated at a temperature of from above 100° C. to about 300° C. The lower limit on the temperature is determined by the necessity that the temperature lie above the boiling point of the water produced by the condensation reaction in order that the water be removed from the interior of the polymerized mass; the upper limit on the temperature which may be employed is determined by the possibility of damage to the polymer, being in particular determined by the thermo-stability of the chemical bonds in the polymer. In general, temperatures of from 200° C. to 250° C. are preferred. In order to agitate the mass to provide large reacting surfaces and to facilitate the removal of the water formed during the reaction it is desirable to bubble a gas, such as nitrogen or hydrogen, which is inert to the reacting substances, through the mass. The gas should be substantially free of oxygen in order to eliminate the possibility of oxidation of the reactants or the product of the reaction. Several hours are required in order to achieve the desired degree of condensation, which is indicated by the molecular weight of the substances.

In general, for coating, impregnating, or fibre or thread forming purposes a molecular weight of from 7,000 to 10,000 and often more, is desirable, although lower molecular weight polymers may also be employed for various purposes, as for molding purposes. A rough but effective test to indicate when the polymer is ready for formation into fibres may be obtained by contacting the condensed mass with a rod which is then drawn away. A continuous strong pliable filament is thus readily formed if the fibre-forming stage has been reached.

Fibres or filaments may be formed of the high molecular weight linear condensation polymer of the present invention by dissolving the polymer in a suitable solvent and extruding the solution through an orifice into a liquid or atmosphere which removes the solvent from the polyester-amide; or by extruding the molten polyester-amide directly into the air, where it solidifies upon cooling. Since, however, the high molecular weight polyesteramide of the present invention is soluble only with difficulty in most of the common solvents, it is desirable that the filaments or fibres be formed from the melt. For similar reasons, coating or impregnating is also preferably done with the molten polymer.

The polyester-amide of the present invention, particularly, when in fibre, filament or sheet form, is readily oriented by directional stresses. When fibres or filaments of the substances are stretched at normal temperatures, i. e., "cold drawn" a reduction in the cross-section and a corresponding increase in the length of the fibre occurs, the magnitude of which is dependent upon the stretch to which the fibre is subjected. The fibre permanently remains in this oriented elongated state, unless heated above its melting point, and has considerably more strength and elasticity than it had prior to the cold drawing operation. Similar beneficial orientation may occur when the polyester-amide of the present invention is employed as a coating or as an impregnant, since scuffing or abrasion to which the polymer may be subjected in use may tend to impart to the polymer a stress which results in the desired orientation.

When cold drawn fibres of the polymer of the present invention are examined by X-rays they furnish a sharp diffraction fibre pattern and also exhibit birefringence and a parallel extinction when observed under crossed Nicol prisms, all of which indicate fibre orientation.

The following examples are illustrative of the present invention:

Example I

Mono-ethanolamine and suberic acid, in proportions by weight of 1.05:1 of their molecular weights, are heated in a suitable vessel at about 225° C. for approximately 12 hours, a stream of oxygen-free hydrogen being bubbled through the mixture. The resulting material at this temperature is a colorless viscous liquid which upon cooling rapidly crystallizes into a hard tough micro-crystalline product. Fibres formed from such molten material may be cold drawn into strong elastic pliable fibres. The polymer melts at about 90° C.

Example II

Mono-ethanolamine and sebacic acid, in proportions by weight of 1.05:1 of their molecular weights, are heated at approximately 250° C. for about 10 hours with a stream of oxygen-free hydrogen bubbling through the mixture. At the above temperature the resulting material is a colorless, viscous liquid which upon cooling readily crystallizes into a hard tough micro-crystalline product having a melting point of approximately 85° C. This polymer too may be formed into fibres having cold drawing properties.

Example III

Adipic acid and 1,10 decanolamine, $$NH_2(CH_2)_{10}OH$$

in an equal molar weight ratio are heated for about 9 hours at about 225° C. in a suitable vessel while a stream of oxygen-free hydrogen is bubbled through the mixture. At the above temperature the resulting product is a colorless viscous liquid which upon cooling crystallizes rapidly to a translucent hard flexible material, of micro-crystalline structure, melting sharply at nearly 102° C. Fibres of this material are readily cold drawn into a highly oriented strong pliable fibre.

Example IV

Suberic acid and 1,10 decanolamine in a molar weight ratio of 1:1 are heated for approximately 13 hours at about 225° C. with a stream of oxygen-free hydrogen bubbled through the mixture to agitate it. At the end of this time the resulting product at said temperature is a colorless viscous liquid which upon cooling crystallizes rapidly to a translucent hard flexible material of micro-crystalline structure. The melting point of this material is very close to 95° C. The fibres formed by this material, as by drawing them from the molten mass, are readily oriented by a cold drawing operation, which results in extremely strong flexible transparent fibres.

Example V

Azelaic acid and 1,10 decanolamine, in a 1 to 1 molecular weight ratio, are heated for about 10 hours at approximately 225° C. in an oxygen-free atmosphere, a stream of oxygen-free hydrogen being bubbled through the mixture. At the end of this time a colorless viscous liquid is the resulting product, which liquid crystallizes rapidly to a hard flexible micro-crystalline material which melts quite sharply at about 77° C. Fibres of this material may be readily cold drawn to produce high oriented strong flexible fibres.

Example VI

Sebacic acid and 1,10 decanolamine in equal molecular weight ratios are heated for about 10 hours at approximately 250° C. in oxygen-free atmosphere with a stream of oxygen-free hydrogen bubbling through the mixture. At this elevated temperature, the resulting product is a colorless viscous liquid which rapidly crystallizes into a hard tough micro-crystalline material upon being cooled below its melting point. Fibres may be formed from the molten material and subsequently cold drawn to produce pliable strong highly oriented fibres.

Example VII

Equal molar weight proportions of 1,10 decane dicarboxylic acid and 1,10 decanolamine are heated for about 12 hours at a temperature of about 225° C. in the absence of oxygen, a stream of oxygen-free hydrogen being bubbled through the mixture to agitate it. As in the preceding cases, the product at the elevated temperature is a colorless viscous liquid which upon reduction of the temperature rapidly crystallizes to a strong tough flexible micro-crystalline solid. From the molten material fibres may be formed which display the properties of cold drawing and which in the final form are elastic, strong and highly oriented.

The 1,10 decanolamine employed in certain of the above examples is a novel substance, the properties of and a method of preparation of which are disclosed and claimed in Patent No. 2,330,107, issued September 21, 1943, to W. S. Bishop.

In each of Examples I and II a small excess of the mono-ethanolamine is employed to make up for that lost during the reaction due to evaporation, since the mono-ethanolamine is quite volatile. If the reactants are employed in substantially equal molecular weight proportions satisfactory products may also be obtained, although greater care is required to prevent loss of the alcoholamine due to evaporation.

In general, commercial mono-alcoholamines are satisfactory, although care should be taken to avoid the use of an alcoholamine, such as ethanolamine, which contains more than a very small percentage of impurities having more than two functional groups, such as, di- or tri-alcoholamines. Otherwise cross-linking or even gelation may occur due to the presence of such impurities having more than two functional groups, with the formation of unsatisfactory or undesirable products.

It is apparent that the above discussed embodiments of this invention are illustrative, that other mono-alcoholamines and other dibasic acids than those indicated and other reacting conditions may be employed, and that the polymers of the present invention may be employed for other purposes than those mentioned, without departing from the spirit of the invention. It is intended that the patent should cover in the appended claims whatever features of novelty reside in the invention.

What is claimed is:

1. A body comprising a microcrystalline linear polymer having permanent molecular orientation produced by the application of directional stress to the reaction product produced by condensing by heating a mixture including a monoalkylolamine which has at least one hydrogen atom attached to the nitrogen atom and an aliphatic dicarboxylic acid which has at least three carbon atoms between the carboxyl groups under polymerizing conditions until substantially completely reacted, the carboxyl groups in said mixture being present in an amount substantially equimolecularly equivalent to the sum of the amino and alcoholic hydroxyl groups, and which reaction product is capable of being cold drawn into fibers exhibiting molecular orientation along the fiber axis.

2. A body comprising a microcrystalline linear polymer having permanent molecular orientation produced by the application of substantial directional stress to the reaction product produced by condensing by heating a mixture including a monoalkylolamine which has at least one hydrogen atom attached to the nitrogen atom and which has its amino and alcoholic hydroxyl groups separated by a straight paraffin polymethylene chain of at least two carbon atoms and an aliphatic dicarboxylic acid which has its carboxyl groups separated by a straight paraffin polymethylene chain of at least three carbon atoms, the carboxyl groups in said mixture being present in an amount substantially equimolecularly equivalent to the sum of the amino and alcoholic hydroxyl groups and said heating being conducted under polymerizing conditions until said mixture is substantially completely reacted, and which reaction product is capable of being cold drawn into fibers exhibiting molecular orientation along the fiber axis.

3. A body comprising a microcrystalline linear polymer having permanent molecular orientation produced by the application of substantial directional stress to the reaction product produced by condensing by heating a mixture of substantially equimolecular proportions of a monoalkylolamine which has at least one hydrogen atom attached to the nitrogen atom and which has its amino and alcoholic hydroxyl groups separated by a straight paraffin polymethylene chain of at least two carbon atoms and an aliphatic dicarboxylic acid which has its carboxyl groups separated by a straight paraffin polymethylene chain of at least three carbon atoms, said heating being conducted under polymerizing conditions until said mixture is substantially completely reacted, and which reaction product is capable of being cold drawn into fibers exhibiting molecular orientation along the fiber axis.

4. A body comprising a microcrystalline linear polymer having permanent molecular orientation produced by the application of substantial directional stress to the reaction product produced by condensing by heating a mixture of substantially equimolecular proportions of monoethanolamine and sebacic acid under polymerizing conditions until said mixture is substantially completely reacted, and which reaction product is capable of being cold drawn into fibers exhibiting molecular orientation along the fiber axis.

5. A body comprising a microcrystalline linear polymer having permanent molecular orientation produced by the application of substantial directional stress to the reaction product produced by condensing by heating a mixture of substantially equimolecular proportions of 1,10 decanolamine and adipic acid under polymerizing conditions until said mixture is completely reacted, and which reaction product is capable of being cold drawn into fibers exhibiting molecular orientation along the fiber axis.

6. A body comprising a microcrystalline linear polymer having permanent molecular orientation produced by the application of substantial directional stress to the reaction product produced by condensing by heating a mixture of substantially equimolecular proportions of 1,10 decanolamine and sebacic acid under polymerizing conditions until said mixture is substantially completely reacted, and which reaction product is capable of being cold drawn into fibers exhibiting molecular orientation along the fiber axis.

CARL J. FROSCH.